(12) United States Patent
Wu

(10) Patent No.: US 8,462,870 B2
(45) Date of Patent: Jun. 11, 2013

(54) MULTI-ANTENNA COMMUNICATION APPARATUS AND METHOD OF MULTI-ANTENNA COMMUNICATION

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/241,895

(22) Filed: Sep. 23, 2011

(65) Prior Publication Data

US 2012/0014475 A1 Jan. 19, 2012

Related U.S. Application Data

(63) Continuation of application No. PCT/JP2009/056138, filed on Mar. 26, 2009.

(51) Int. Cl.
*H04B 7/02* (2006.01)
(52) U.S. Cl.
USPC .......................................................... 375/267
(58) Field of Classification Search
CPC ..................................................... H04L 1/0618
USPC ................................. 375/260, 267, 295, 316
See application file for complete search history.

(56) References Cited

U.S. PATENT DOCUMENTS

| | | | |
|---|---|---|---|
| 6,185,258 B1 * | 2/2001 | Alamouti et al. | 375/260 |
| 7,116,724 B2 | 10/2006 | You | |
| 2004/0057530 A1 * | 3/2004 | Tarokh et al. | 375/267 |
| 2005/0058212 A1 | 3/2005 | Shao | |
| 2005/0085195 A1 * | 4/2005 | Tong et al. | 455/101 |
| 2008/0192856 A1 * | 8/2008 | Jongren et al. | 375/267 |
| 2008/0229168 A1 | 9/2008 | Murakami et al. | |
| 2009/0041151 A1 * | 2/2009 | Khan et al. | 375/267 |
| 2009/0098876 A1 * | 4/2009 | Khan et al. | 455/445 |
| 2009/0110114 A1 * | 4/2009 | Onggosanusi et al. | 375/299 |
| 2009/0225737 A1 * | 9/2009 | Kim et al. | 370/342 |

(Continued)

FOREIGN PATENT DOCUMENTS

| | | |
|---|---|---|
| JP | 2001144663 | 5/2001 |
| JP | 2002043981 | 2/2002 |

(Continued)

OTHER PUBLICATIONS

Vehkapera et al., Layered Space-Frequency Coding and Receiver Design for MIMO MC-CDMA, 2004, Communications, 2004 IEEE International Conference on, vol. 5, pp. 3005-3009.*

(Continued)

*Primary Examiner* — Juan A Torres
(74) *Attorney, Agent, or Firm* — Myers Wolin, LLC

(57) ABSTRACT

A transmitter includes a mapping unit that maps first information data to a first layer and maps second information data a part of which is duplicative of and a part of which is different from the first information data to a second layer, a coding unit that generates transmission data by performing error detection coding and error correction coding on the first and second information data, and a transmitting unit that transmits the transmission data from the antennas corresponding to the respective layers. A receiver includes a reception processing unit that separates received data into layer data, a decoding unit that generates a soft-decision value for each of the layers, a combining unit that combines soft-decision values corresponding to information data mapped to the plurality of layers in duplicate, and a deciding unit that performs hard-decision on the layer data using a soft-decision value.

14 Claims, 11 Drawing Sheets

U.S. PATENT DOCUMENTS

| | | | | |
|---|---|---|---|---|
| 2010/0027696 A1* | 2/2010 | Lee et al. | | 375/260 |
| 2010/0054353 A1* | 3/2010 | Roh et al. | | 375/260 |
| 2010/0183057 A1* | 7/2010 | Lee et al. | | 375/219 |
| 2011/0078529 A1 | 3/2011 | Wu et al. | | |

FOREIGN PATENT DOCUMENTS

| | | |
|---|---|---|
| JP | 2003163960 | 6/2003 |
| JP | 2004260713 | 9/2004 |
| JP | 2007-28569 | 2/2007 |
| JP | 2007-506303 | 3/2007 |
| KR | 2003-0010402 | 2/2003 |
| WO | 2006057195 | 6/2006 |
| WO | 2006/106613 | 10/2006 |
| WO | 2009022402 | 2/2009 |

OTHER PUBLICATIONS

Alamouti, "A simple transmit diversity technique for wireless communications," IEEE Journal Select Areas Communications, vol. 16, No. 8, pp. 1451-1458, Oct. 1998.*

Adachi, "LDPC Coded Iterative Signal Detection Based on QRD-M with CRC Check" 2006 IEEE 64th Vehicular Technology Conference, 2006, VTC-2006 Fall, 2006, pp. 1-5.*

Liu, "A Novel Turbo Equalization for MIMO Frequency Selective Fading Channels" 2006 International Conference on Communications, Circuits and Systems Proceedings, vol. 2, 2006, pp. 1063-1067.*

Love, et al. "Grassmannian Beamforming for Multi-Input Multiple-Output Wireless Systems", IEEE Transactions on Information Theory, vol. 49 No. 10, Oct. 2003.

Love, et al. "Limited Feedback Unitary Precoding for Spatial Multiplexing Systems", IEEE Transactions on Information Theory, vol. 51, No. 8, Aug. 2005.

Abe, et al. "Differential Codebook MIMO Precoding Technique", Downloaded from IEEE Xplore, Nov. 28, 2008.

Love, et al. "What is the Value of Limited Feedback for MIMO Channels?", IEEE Communications Magazine, Oct. 2004.

3GPP TS 36.211 V8.3.0 (May 2008), 3rd Generation Partnership Project; Technical Specification Group Radio Access Network; Evolved Universal Terrestrial Radio Access (E-UTRA); "Physical Channels and Modulation(Release 8)", May 2008.

Oborina, et al. "MIMO Performance Evaluation in UTRAN Long Term Evolution Downlink", CCIS, Mar. 19-21, 2008.

Kovacs, et al. "Performance of MIMO Aware RRM in Downlink OFDMA", IEEE VTC Spring May 11-14, 2008. Down loaded on Nov. 28, 2008 from IEEE Xplore.

Joung, et al . "Capacity Evaluation of Various Multiuser MIMO Schemes in Downlink Cellular Environments", 17th Annual IEEE International Symposium on Personal, Indoor and Mobile Radio Communications, Sep. 2006.

Wei, et al. "Performance of MIMO with Frequency Domain Packet Scheduling in UTRAN LTE downlink", Vehicular Technology Conference, Apr. 22-25, 2007.

Nortel; R1-062145; "DL Adaptive MIMO Performance Evaluation" 3GPP TSG-RAN1 WG1#46, Tallinn, Estonia, Aug. 28-Sep. 1, 2006.

Akinori Nakajima, et al., "Turbo Coded MIMO System With Adaptive Parallel Interference Canceller" IEICE Technical Report, May 16, 2003, p. 61-68, RCS2003-39.

Nakajima, A. et al., Turbo Coded MIMO Multiplexing With Interactive Adaptive Soft Parallel Interference Cancellation, Vehicular Technology Conference, 2004. VTC2004-Fall. 2004 IEEE 60TH, Sep. 26, 2004, vol. 2, pp. 1410-1414.

International Search Report issued for International Application No. PCT/JP2009/056138 mailed May 19, 2009 with English translation.

I. Emre Telatar; "Capacity of Multi-antenna Gaussian Channels"; dated Jun. 1995.

Shkumbin Hamiti, Nokia; The Draft IEEE 802.16m "System Description Document" dated Oct. 3, 2008.

3GPP TR 25.814 V7.0.0 (Jun. 2006); "Physical layer aspects for evolved Universal Terrestrial Radio Access (UTRA) (Release 7)" dated Jun. 2006.

Caire et al.; "On the Achievable Throughput of a Multiantenna Gaussian Broadcast Channel" dated Jul. 2003.

Spencer et al.; "Zero-Forcing Methods for Downlink Spatial Multiplexing in Multiuser MIMO Channels" dated Feb. 2004.

Schubert et al.; "Downlink Sum-MSE Transceiver Optimization for Linear Multi-User MIMO Systems" dated Nov. 1, 2005.

Shuying Shi et al; "Downlink MMSE Transceiver Optimization With Layer-MSE Requirements" Oct. 25-27, 2006.

Schmidt et al.; "Minimum Mean Square Error Vector Precoding" dated Sep. 2005.

Notice of Preliminary Rejection issued for corresponding Korean Patent Application No. 10-2011-7022492, mailed Dec. 18, 2012 with English translation.

Notice of Rejection issued for corresponding Japanese Patent Application No. 2011-505758, mailed Mar. 26, 2013, with English translation.

* cited by examiner

FIG.6
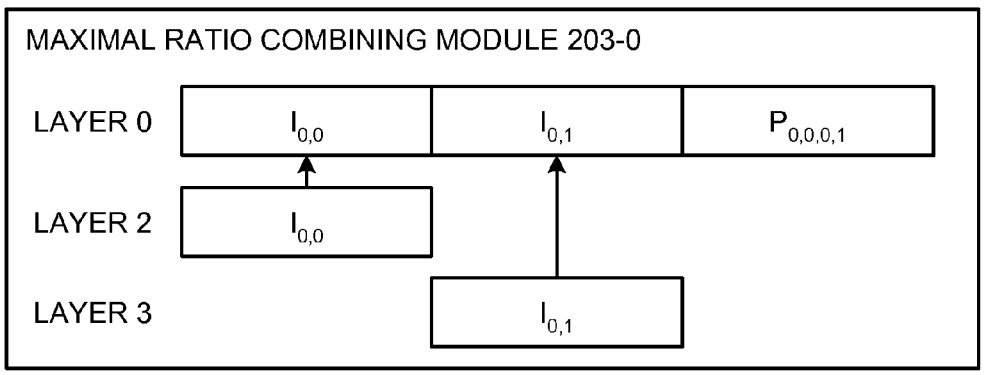
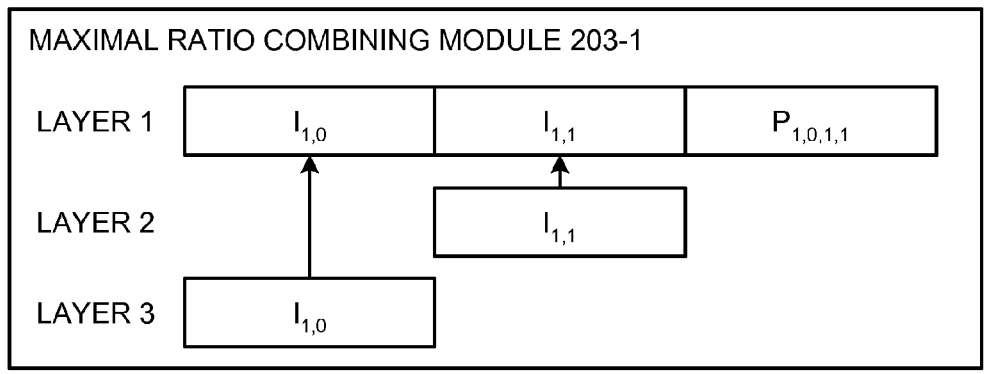
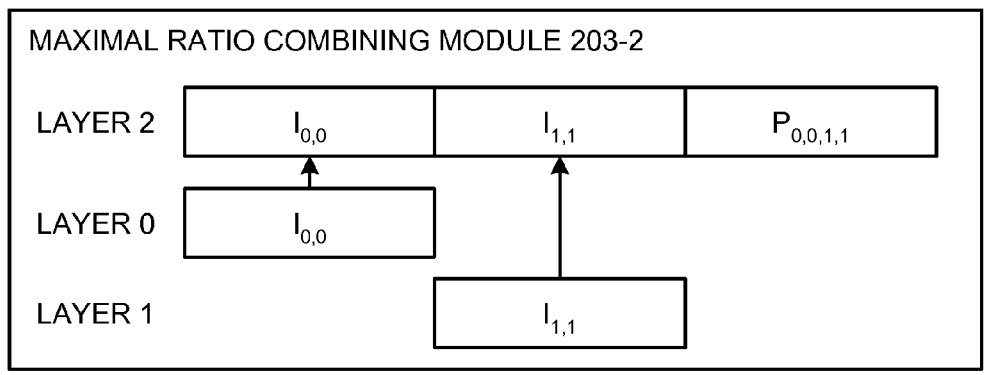
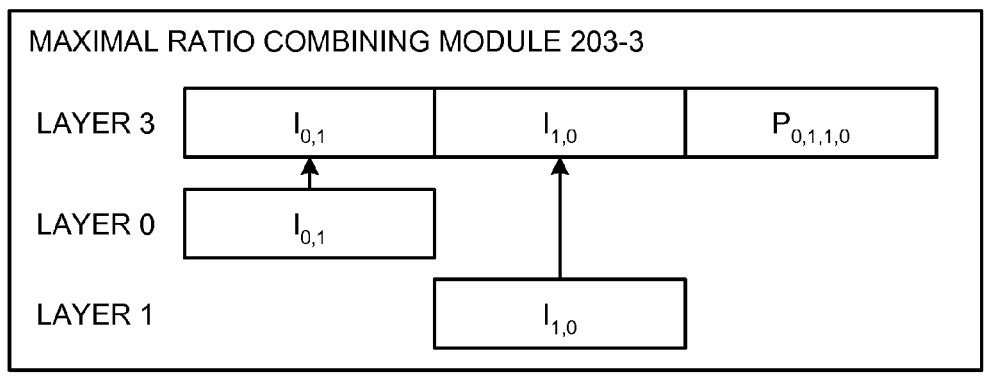

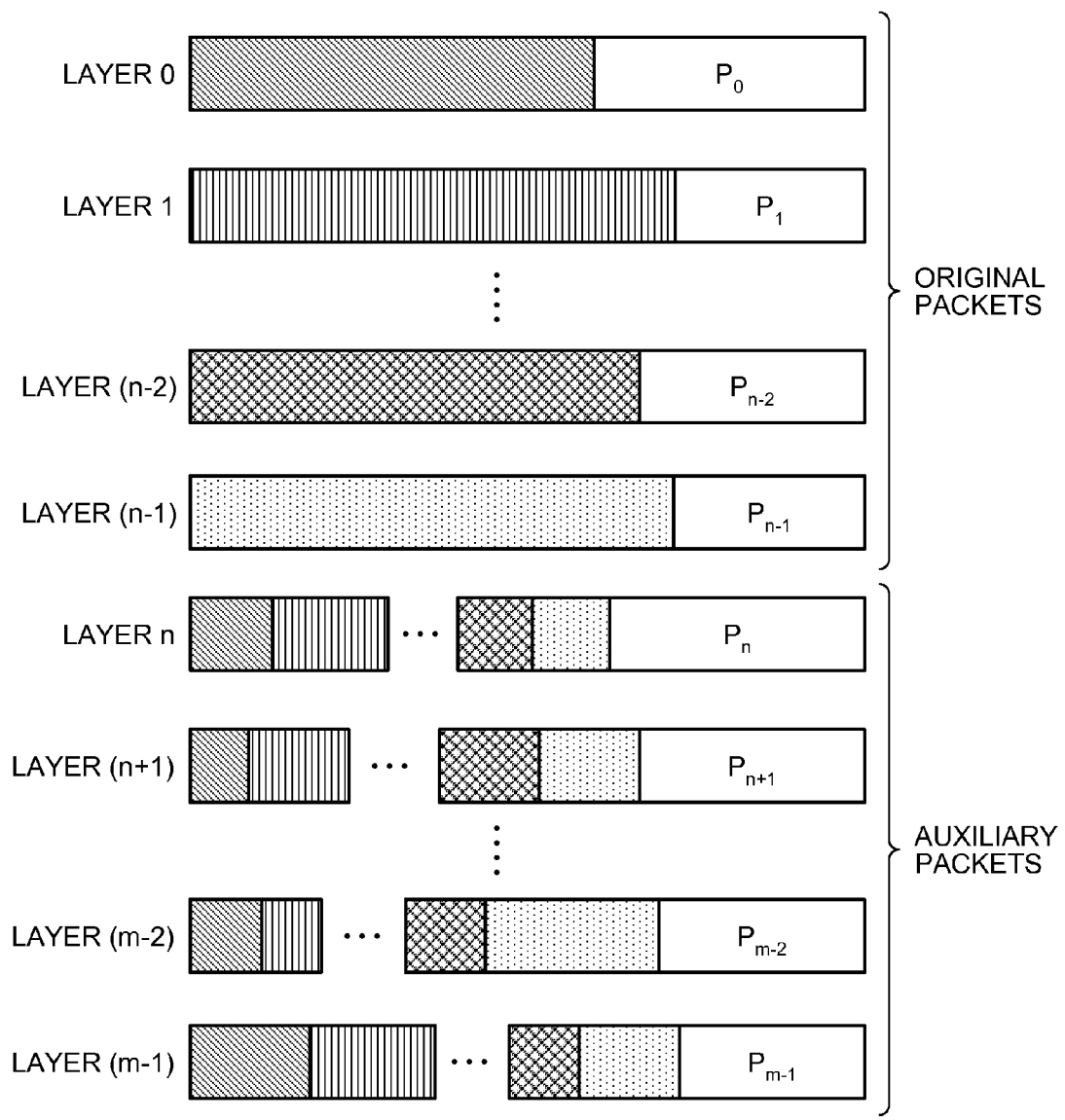

MULTI-ANTENNA COMMUNICATION APPARATUS AND METHOD OF MULTI-ANTENNA COMMUNICATION

CROSS-REFERENCE TO RELATED APPLICATION

This application is a continuation of International Application No. PCT/JP2009/056138, filed on Mar. 26, 2009, now pending, the entire contents of which are wholly incorporated herein by reference.

FIELD

The embodiment discussed herein is directed to a multi-antenna communication apparatus and a method of multi-antenna communication.

BACKGROUND

Recently, in a wireless communications field, studies have been made concerning multiple-input multiple-output (MIMO) that allows throughput to be improved by providing a plurality of antennas on both a transmitter and a receiver. A transmitter for MIMO transmits different data from a plurality of transmitting antennas at the same time. This makes it theoretically possible to transmit data in multiples of the number of transmitting antennas comparing with a transmitter of a single transmitting antenna. A receiver for MIMO receives data by a plurality of receiving antennas and separates from one another the data transmitted from the respective transmitting antennas by carrying out, for example, a matrix operation.

In other words, in MIMO, the data transmitted from the transmitting antennas are propagated through channels of different characteristics, and the data propagated through each of the channels are combined and are received by each of the receiving antennas of the receiver. Therefore, the receiver uses the combined data received by each of the receiving antennas to separate from one another the data for each of the transmitting antennas. In this case, for the receiver to correctly separate the data transmitted from each of the transmitting antennas, it is desirable that the deterioration in reception quality by channel characteristics be compensated.

Accordingly, it has been studied for the transmitter to perform precoding that applies in advance inverse characteristics of the channel characteristics to the data to be transmitted from each of the transmitting antennas. Specifically, when channel state information (CSI) indicative of channel characteristics is fed back from the receiver to the transmitter, the transmitter performs the precoding using a codebook so as to compensate the deterioration in reception quality attributable to the channel characteristics estimated from the CSI.

However, an error rate in the receiver may not be sufficiently reduced by the compensation for deterioration in reception quality using the precoding alone, and thus an improvement of throughput by MIMO is difficult. In other words, even when the transmitter transmits data different from one another from the multiple transmitting antennas at the same time, unless the error rate in the receiver is sufficiently reduced, retransmission of data occurs frequently. As a result, the transmitter ends up transmitting the same data a number of times and, not only is throughput not improved, but it may adversely lower the throughput by adopting MIMO.

SUMMARY

According to an aspect of an embodiment of the invention, a multi-antenna communication apparatus includes a mapping unit that maps first information data to a first layer out of a plurality of layers corresponding to a plurality of antennas and maps second information data a part of which is duplicative of and a part of which is different from the first information data to a second layer; a coding unit that generates transmission data by performing error detection coding and error correction coding for each of the layers on the first and second information data mapped by the mapping unit; and a transmitting unit that transmits the transmission data for each of the layers generated by the coding unit from the antennas corresponding to the respective layers.

According to another aspect of an embodiment of the invention, a multi-antenna communication apparatus includes a reception processing unit that receives data of a plurality of layers in which a part of information data mapped is in duplicate and a part thereof is different, and separates received data into layer data for each of the layers; a decoding unit that generates a soft-decision value for each of the layers by performing error correction decoding on the layer data obtained by being separated by the reception processing unit; a combining unit that combines soft-decision values corresponding to information data mapped to the plurality of layers in duplicate out of soft-decision values for the respective layers generated by the decoding unit; and a deciding unit that performs hard-decision on the layer data using a soft-decision value obtained by being combined by the combining unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram illustrating a specific example of combining energy of data;

FIG. 12 is a diagram illustrating yet another specific example of cross-layer mapping.

DESCRIPTION OF EMBODIMENT

Preferred embodiment of the present invention will be explained with reference to accompanying drawings.

Configuration of Transmitter

Figure 1:
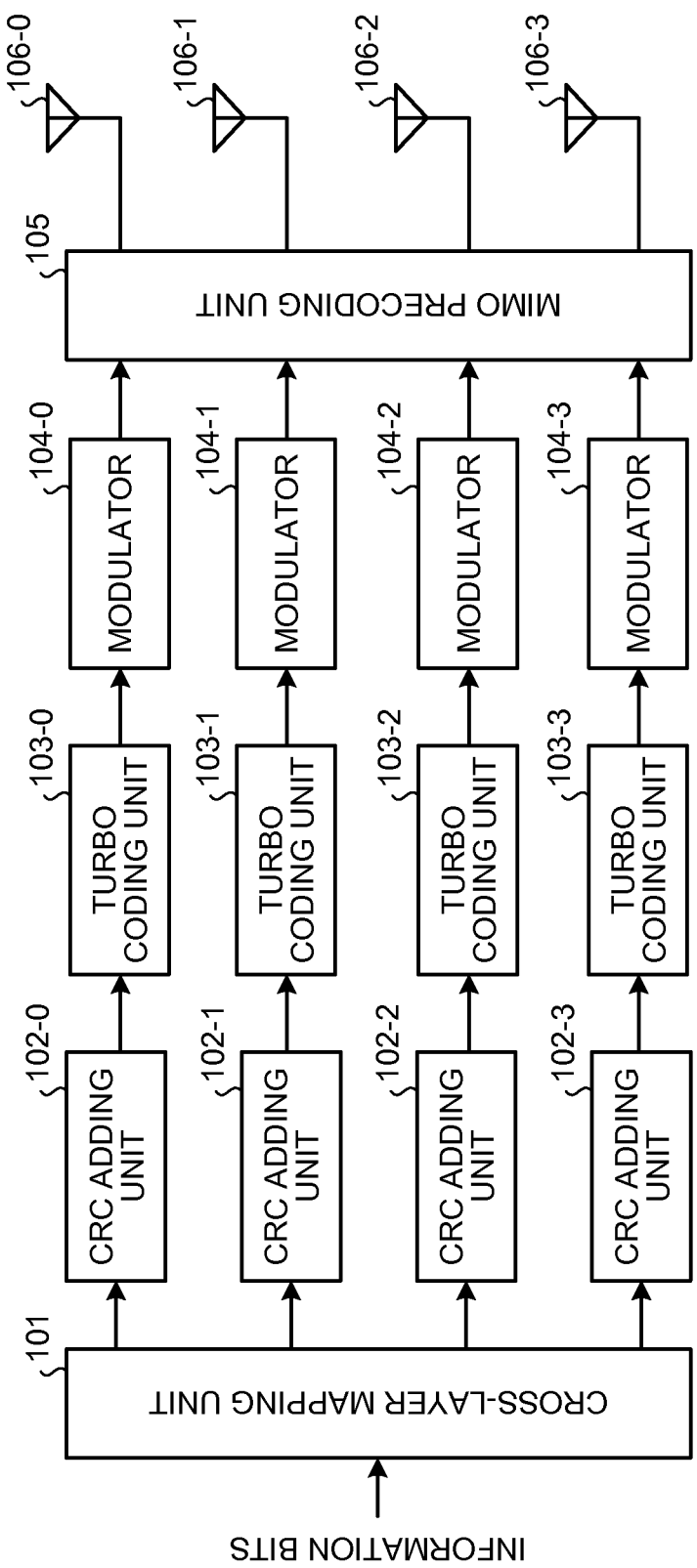
FIG. 1 is a block diagram illustrating a configuration of a transmitter according to one embodiment.

FIG. 1 is a block diagram illustrating a configuration of a transmitter according to the present embodiment. The transmitter illustrated in FIG. 1 includes a cross-layer mapping unit 101, cyclic redundancy check (CRC) adding units 102-0 to 102-3 as one example of error detection coding, turbo coding units 103-0 to 103-3 as one example of error correction coding, modulators 104-0 to 104-3, a MIMO precoding unit 105, and antennas 106-0 to 106-3. In FIG. 1, a layer corresponding to the CRC adding unit 102-0, the turbo coding unit 103-0, the modulator 104-0, and the antenna 106-0 is referred to as a layer 0. Similarly, layers corresponding to the CRC adding units 102-1 to 102-3, the turbo coding units 103-1 to 103-3, the modulators 104-1 to 104-3, and the antennas 106-1 to 106-3 are referred to as a layer 1, a layer 2, and a layer 3, respectively.

The cross-layer mapping unit 101 maps, when information bits corresponding to packets for two layers are input, the information bits by dividing and combining the information bits to a total of four layers. Specifically, the cross-layer mapping unit 101 maps, for example, input information bits corresponding to packets for two layers to the layer 0 and the layer 1. In other words, the layer 0 and the layer 1 are layers where information bits input are mapped without any change.

The cross-layer mapping unit 101 then divides the information bits mapped to the layer 0 and the layer 1 and maps them to the layer 2 and the layer 3. Specifically, the cross-layer mapping unit 101 maps, for example, a first half portion of the information bits mapped to the layer 0 and a second half portion of the information bits mapped to the layer 1 combined to the layer 2. The cross-layer mapping unit 101 further maps, for example, a second half portion of the information bits mapped to the layer 0 and a first half portion of the information bits mapped to the layer 1 combined to the layer 3.

Thus, the cross-layer mapping unit 101 maps the same information bits to a plurality of layers in duplicate. Therefore, in the above-described example, the first half portion of the layer 0 and a portion of the layer 2 are in duplicate, and the second half portion of the layer 0 and a portion of the layer 3 are in duplicate. The first half portion of the layer 1 and a portion of the layer 3 are in duplicate, and the second half portion of the layer 1 and a portion of the layer 2 are in duplicate.

The CRC adding units 102-0 to 102-3 add a CRC for error detection to information bits of each layer and output the information bits including the CRC for each of the layers to the corresponding turbo coding units 103-0 to 103-3, respectively.

The turbo coding units 103-0 to 103-3 perform turbo coding on the information bits of the layers 0 to 3, respectively, and generate coded data that are information bits of the layers 0 to 3 with redundant bits added. Coding rates in the turbo coding units 103-0 to 103-3 may be the same as or different from one another. In the followings, explanations are made mainly assuming that the coding rates in the turbo coding units 103-0 to 103-3 are the same.

The modulators 104-0 to 104-3 modulate the coded data of the layers 0 to 3, respectively, and output the modulated data obtained to the MIMO precoding unit 105. In this case, the modulators 104-0 to 104-3 modulate the coded data by a modulation method of, for example, quadrature phase shift keying (QPSK), 16 quadrature amplitude modulation (QAM), or 64 QAM.

The MIMO precoding unit 105 receives channel state information (CSI) transmitted from a later-described receiver via the antennas 106-0 to 106-3 and performs precoding on packets including the modulated data for the respective layers based on the CSI received. More specifically, the MIMO precoding unit 105 sets a codebook from channel characteristics information included in CSI and applies inverse characteristics of channel characteristics to packets of the layers 0 to 3 using the set codebook. The MIMO precoding unit 105 then transmits pre-coded packets of the layers 0 to 3 from the corresponding antennas 106-0 to 106-3, respectively.

As it will be understood by a person skilled in the art, the cross-layer mapping unit 101, the CRC adding units 102-0 to 102-3, the turbo coding units 103-0 to 103-3, the modulators 104-0 to 104-3 and the MIMO precoding unit 105 are realized, for example, by at least a processor such as a CPU (central processing unit), and at least a memory such as a RAM (random access memory).

Configuration of Receiver

Figure 2:
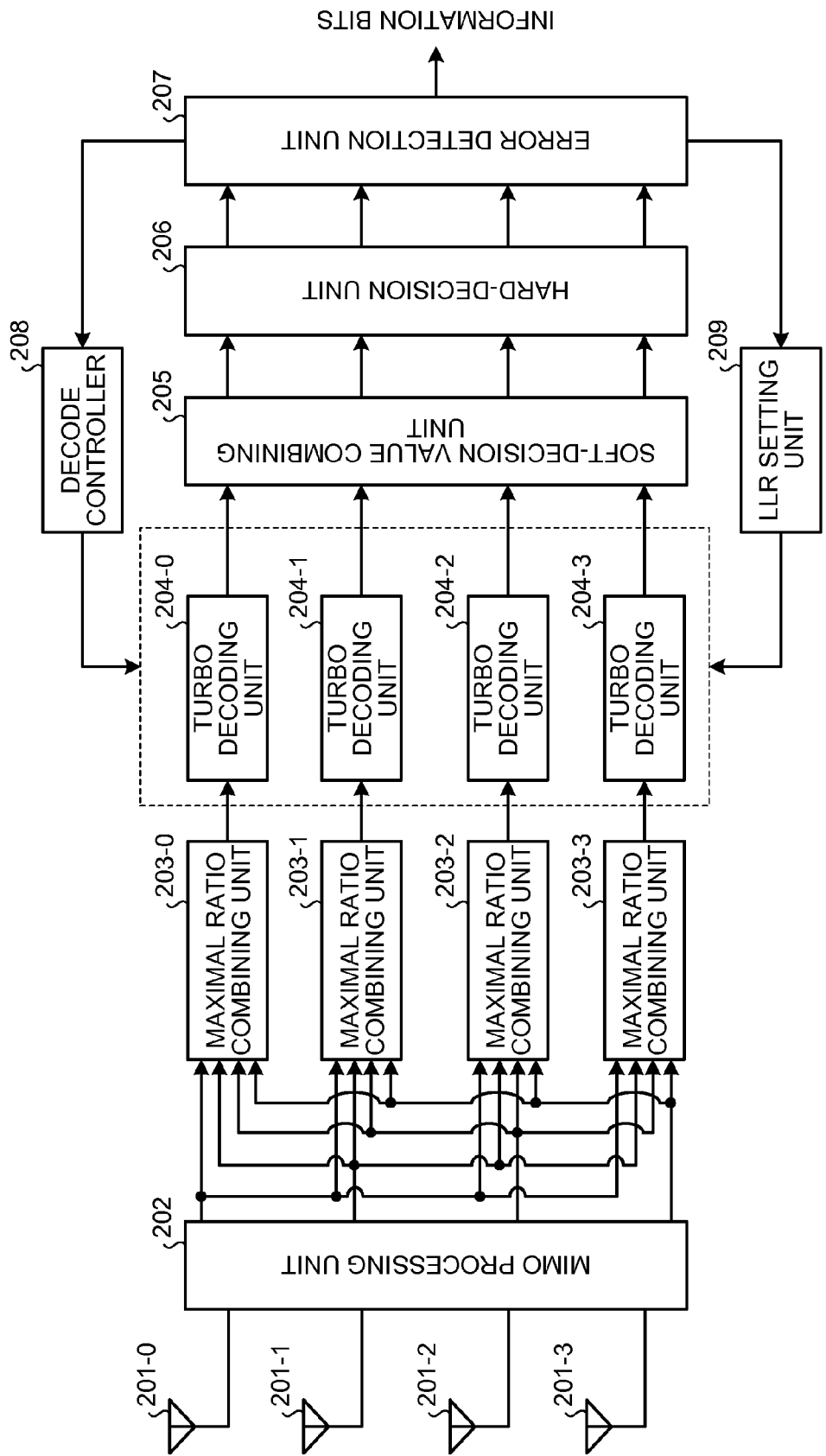
FIG. 2 is a block diagram illustrating a configuration of a receiver according to the one embodiment.

FIG. 2 is a block diagram illustrating a configuration of a receiver according to the present embodiment. The receiver illustrated in FIG. 2 includes antennas 201-0 to 201-3, a MIMO processing unit 202, maximal ratio combining units 203-0 to 203-3, turbo decoding units 204-0 to 204-3, a soft-decision value combining unit 205, a hard-decision unit 206, an error detection unit 207, a decode controller 208, and a log-likelihood ratio (LLR) setting unit 209.

The MIMO processing unit 202 receives data transmitted from the transmitter via the antennas 201-0 to 201-3, and by carrying out a given matrix operation and such, separates packets of the layers 0 to 3 transmitted from the antennas 106-0 to 106-3 of the transmitter, respectively. The MIMO processing unit 202 further estimates channel characteristics from the data received, and feeds back CSI that includes estimated results to the transmitter via the antennas 201-0 to 201-3.

The maximal ratio combining units 203-0 to 203-3 perform maximal ratio combining on duplicate portions of the packets of the layers 0 to 3. Specifically, the maximal ratio combining unit 203-0 performs maximal ratio combining, for example, on duplicate portions of the packet of the layer 0 and the packets of the layer 2 and the layer 3. Similarly, the maximal ratio combining unit 203-1 performs maximal ratio combining on duplicate portions of the packet of the layer 1 and the packets of the layer 2 and the layer 3, and the maximal ratio combining units 203-2, 203-3 perform maximal ratio combining on respective duplicate portions of the packets of the layers 2, 3 and the packets of the layer 0 and the layer 1.

In FIG. 2, while the MIMO processing unit 202 and the maximal ratio combining units 203-0 to 203-3 are connected such that packets of all the layers 0 to 3 are input to each of the maximal ratio combining units 203-0 to 203-3, the maximal ratio combining units 203-0 to 203-3 may not necessarily receive packets of all the layers 0 to 3. In other words, the maximal ratio combining units 203-0 to 203-3 receive at least the respective packets of the layers 0 to 3 and the packets having duplicate portions of the respective layers 0 to 3.

The turbo decoding units 204-0 to 204-3 perform turbo decoding on packets of the layers 0 to 3 in which maximal ratio combining is performed on duplicate portions, respectively. Specifically, the turbo decoding units 204-0 to 204-3 perform turbo decoding on the packets using redundant bits added to the packets of the layers 0 to 3 and using LLRs. The turbo decoding units 204-0 to 204-3 further perform iterative decoding on the packets of the layers 0 to 3 according to control by the decode controller 208.

In the second and subsequent rounds of decoding, the turbo decoding units 204-0 to 204-3 substitute parts of packets specified by the LLR setting unit 209 with hard-decision values fed back from the LLR setting unit 209 and set LLRs for the substituted portions to infinity to perform turbo decoding on the packets. Because a portion with an LLR of infinity means high likelihood, the turbo decoding units 204-0 to 204-3 perform error correction decoding of a higher accuracy than a previous round. In the second and subsequent rounds of decoding, at least the turbo decoding units 204-0 to 204-3 corresponding to the layers in which substitution with a hard-decision value occurred perform turbo decoding on the packets.

The soft-decision value combining unit 205 combines respective soft-decision values for information bits of the layers 0 to 3 obtained as a result of turbo decoding of packets of the layers 0 to 3 performed by the turbo decoding units 204-0 to 204-3. Specifically, the soft-decision value combining unit 205 combines, for example, a soft-decision value for information bits of the layer 0 and respective soft-decision values for corresponding portions of the layer 2 and the layer 3. Similarly, the soft-decision value combining unit 205 combines a soft-decision value for information bits of the layer 1 and respective soft-decision values for corresponding portions of the layer 2 and the layer 3. In other words, the soft-decision value combining unit 205 combines soft-decision values for information bits of the respective layers 0 to 3 that are in duplicate.

The hard-decision unit 206 performs hard-decision on the soft-decision values combined by the soft-decision value combining unit 205 and determines whether each of the information bits of the respective layers 0 to 3 is either 0 or 1. In other words, the hard-decision unit 206 obtains respective hard-decision values corresponding to the information bits of the layers 0 to 3 in the transmitter.

The error detection unit 207 detects errors in the hard-decision value for each of the layers 0 to 3 using CRCs included in the information bits of the layers 0 to 3. More specifically, the error detection unit 207 uses a portion of the hard-decision value for each of the layers 0 to 3 obtained in the hard-decision unit 206 that corresponds to the CRC to determine whether the hard-decision value for each of the layers 0 to 3 is equal to the respective information bits of the layers 0 to 3 in the transmitter. When it is determined that there is no error in the hard-decision value for each of the layers 0 to 3, the error detection unit 207 then obtains the information bits in the transmitter from the hard-decision value and outputs the information bits. In other words, the error detection unit 207 removes portions in which hard-decision values are in duplicate and outputs, for example, hard-decision values for the layer 0 and the layer 1 as the information bits in the transmitter.

The decode controller 208, in response to a result of error detection in the error detection unit 207, controls execution or non-execution of iterative decoding by the turbo decoding units 204-0 to 204-3. Specifically, when there is no error in all the layers 0 to 3 or when there are errors in all the layers 0 to 3, the decode controller 208 makes iterative decoding cancelled. When there are both layers having errors and layers not having any errors present, the decode controller 208 makes iterative decoding carried out. However, when the number of layers not having any errors is not increased compared with the previous round of decoding, the decode controller 208 makes iterative decoding cancelled.

The LLR setting unit 209, as a result of error detection in the error detection unit 207, feeds back hard-decision values for layers not having any errors to the turbo decoding units 204-0 to 204-3, and in the turbo decoding units 204-0 to 204-3 that use the hard-decision values, sets LLRs corresponding to the hard-decision values to infinity. More specifically, the LLR setting unit 209 feeds back hard-decision values for layers in which errors are newly eliminated by decoding performed in this time round to the turbo decoding units 204-0 to 204-3, and makes portions of packets corresponding to the hard-decision values substituted with the hard-decision values. Thereafter, the LLR setting unit 209 sets LLRs for the substituted portions to infinity and makes the turbo decoding units 204-0 to 204-3 perform turbo decoding again. Substituting portions of packets with hard-decision values and setting LLRs to infinity provide an improvement in the accuracy of turbo decoding by the turbo decoding units 204-0 to 204-3 with respect to the previous round of decoding.

As it will be understood by a person skilled in the art, the MIMO processing unit 202, the maximal ratio combining units 203-0 to 203-3, the turbo decoding units 204-0 to 204-3, the soft-decision value combining unit 205, the hard-decision unit 206, the error detection unit 207, the decode controller 208 and the LLR setting unit 209 are realized, for example, by at least a processer such as a CPU (central processing unit), and at least a memory such as a RAM (random access memory).

Transmitting Operation of Transmitter

Figure 3:
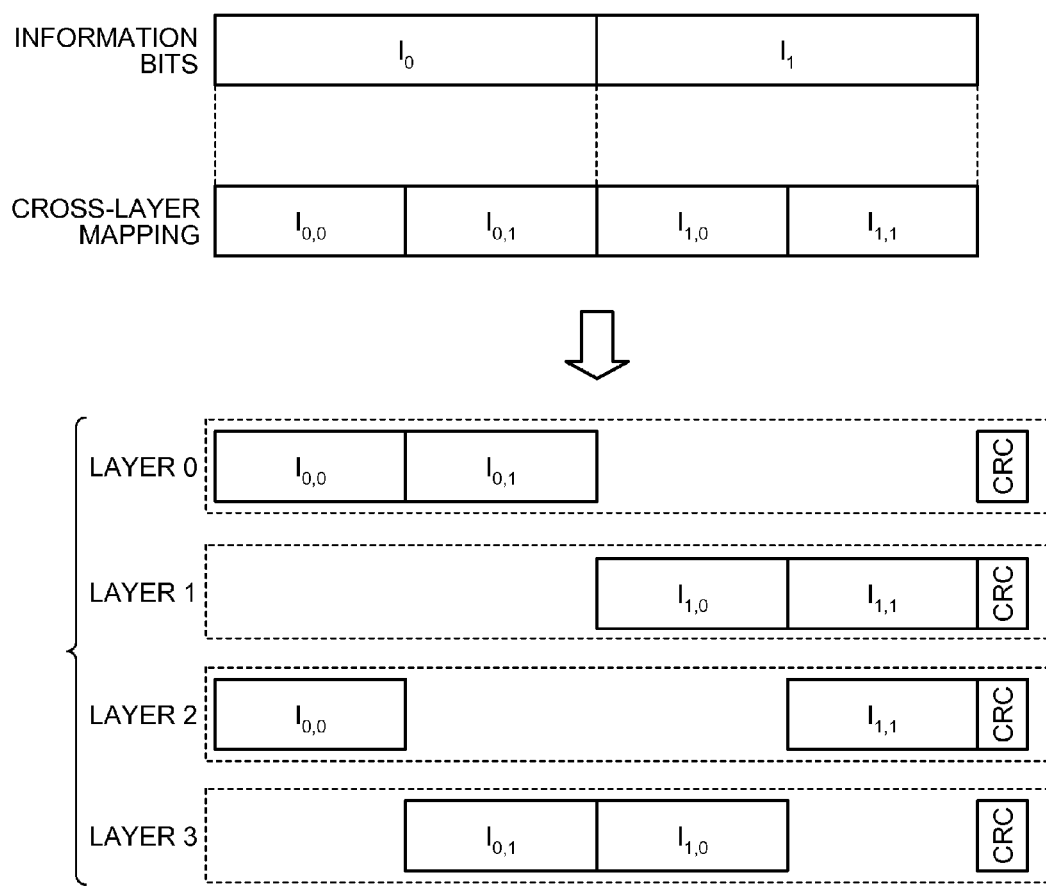
FIG. 3 is a diagram illustrating a specific example of cross-layer mapping.

The operation performed by the transmitter illustrated in FIG. 1 will be explained with specific examples. FIG. 3 is a diagram illustrating a state of information bits being mapped to the layers 0 to 3 in the transmitter.

As illustrated in FIG. 3, when information bits I0, I1 corresponding to packets of two layers are input to the cross-layer mapping unit 101, the information bits I0, I1 are mapped over four layers of the layers 0 to 3 by the cross-layer mapping unit 101. Specifically, the cross-layer mapping unit 101 divides the information bits I0 into information bits I0,0, I0,1 and divides the information bits I1 into information bits I1,0, I1,1. Then, the cross-layer mapping unit 101 maps the information bits I0,0 to the layer 0 and the layer 2 in duplicate, maps the information bits I0,1 to the layer 0 and the layer 3 in duplicate, maps the information bits I1,0 to the layer 1 and the layer 3 in duplicate, and maps the information bits I1,1 to the layer 1 and the layer 2 in duplicate.

In other words, while mapped to the layer 0 and the layer 1 are the original information bits I0, I1 successively in the original order, mapped to the layer 2 and the layer 3 are parts of the information bits mapped to the layer 0 and the layer 1 in duplicate. Accordingly, when comparing the layer 0 with the layer 2 or the layer 3, the partial information bits I0,0, I0,1 are in duplicate and the partial information bits I1,1, I1,0 are different. Similarly, when comparing the layer 1 with the layer 2 or the layer 3, the partial information bits I1,1, I1,0 are in duplicate and the partial information bits I0,0, I0,1 are different.

Consequently, mapping by the cross-layer mapping unit 101 is carried out, with the layer 0 and the layer 1 as references, by generating the layer 2 and the layer 3 parts of which are duplicative of and parts of which are different from respective parts of the layer 0 and the layer 1. While all the information bits I0,0, I0,1, I1,0, I1,1 of the layer 0 and the layer 1 are in duplicate here, all the information bits I0,0, I0,1, I1,0, I1,1 may not necessarily be in duplicate. In short, in any combination of the layers of the references (the layer 0 and the layer 1 here) and layers other than those (the layer 2 and the layer 3 here), a part of information bits is in duplicate and a part of the information bits is different.

The information bits mapped to the respective layers 0 to 3 by the cross-layer mapping unit 101 are output to the CRC adding units 102-0 to 102-3, respectively, and CRCs corresponding to the information bits of the layers 0 to 3 are added thereto by the CRC adding units 102-0 to 102-3. The information bits of the layers 0 to 3 including the CRCs are output to the corresponding turbo coding units 103-0 to 103-3 where turbo coding is performed. Specifically, the turbo coding unit 103-0 adds redundant bits P0,0,0,1 to the information bits I0,0 and the information bits I0,1 of the layer 0, and the turbo coding unit 103-1 adds redundant bits P1,0,1,1 to the information bits I1,0 and the information bits I1,1 of the layer 1. Similarly, the turbo coding unit 103-2 adds redundant bits P0,0,1,1 to the information bits I0,0 and the information bits I1,1 of the layer 2, and the turbo coding unit 103-3 adds redundant bits P0,1,1,0 to the information bits I0,1 and the information bits I1,0 of the layer 3.

A combination of information bits and redundant bits obtained by turbo coding in the respective turbo coding units 103-0 to 103-3 forms a single packet. More specifically, the combination of the information bits I0,0, the information bits I0,1, and the redundant bits P0,0,0,1 forms a packet of the layer 0, and the combination of the information bits I1,0, the information bits I1,1, and the redundant bits P1,0,1,1 forms a packet of the layer 1. The combination of the information bits I0,0, the information bits I1,1, and the redundant bits P0,0,1,1 forms a packet of the layer 2, and the combination of the information bits I0,1, the information bits I1,0, and the redundant bits P0,1,1,0 forms a packet of the layer 3.

Figure 4:
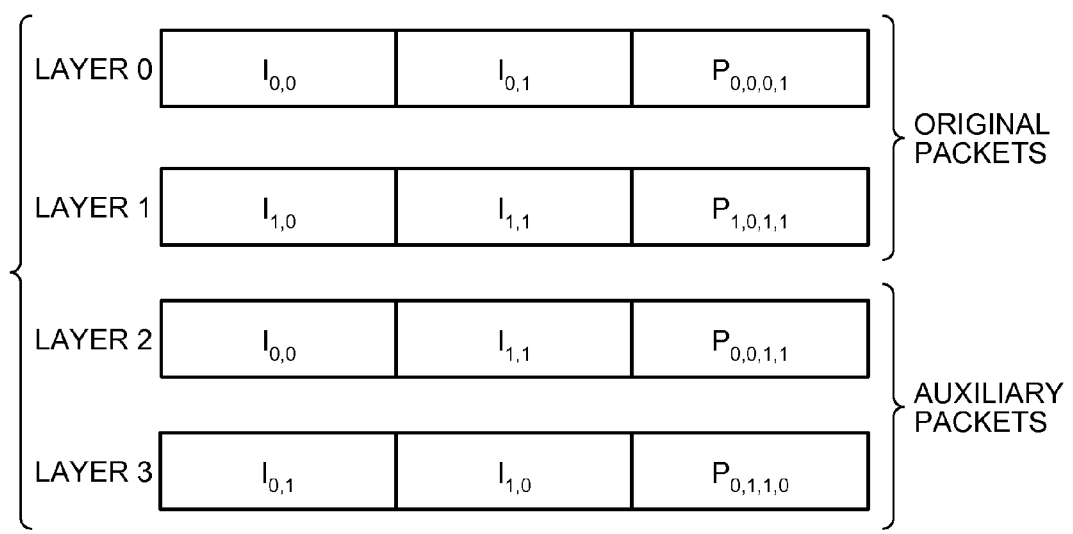
FIG. 4 is a diagram illustrating a specific example of original packets and auxiliary packets.

In this case, as described above, in the layer 0 and the layer 1, because original information bits I are continuous in the original order, as illustrated in FIG. 4, packets of the layer 0 and the layer 1 are referred to as original packets. Meanwhile, in the layer 2 and the layer 3, because the information bits of the layer 0 and the layer 1 are duplicately mapped in an auxiliary manner, as illustrated in FIG. 4, packets of the layer 2 and the layer 3 are referred to as auxiliary packets. In FIG. 4, the depiction of CRCs is omitted. Furthermore, in drawings referenced in the following explanation, while the depiction of CRCs is omitted, the CRCs are actually added to information bits of the respective layers.

Packets of the respective layers 0 to 3 are modulated by the modulators 104-0 to 104-3, subjected to precoding in response to channel characteristics by the MIMO precoding unit 105, and transmitted from the corresponding antennas 106-0 to 106-3. More specifically, the antenna 106-0 transmits the original packets of the layer 0, the antenna 106-1 transmits the original packets of the layer 1, the antenna 106-2 transmits the auxiliary packets of the layer 2, and the antenna 106-3 transmits the auxiliary packets of the layer 3. These packets are combined after being propagated through respective different channels, and are received by each of the antennas 201-0 to 201-3 of the receiver.

Receiving Operation of Receiver

Figure 5:
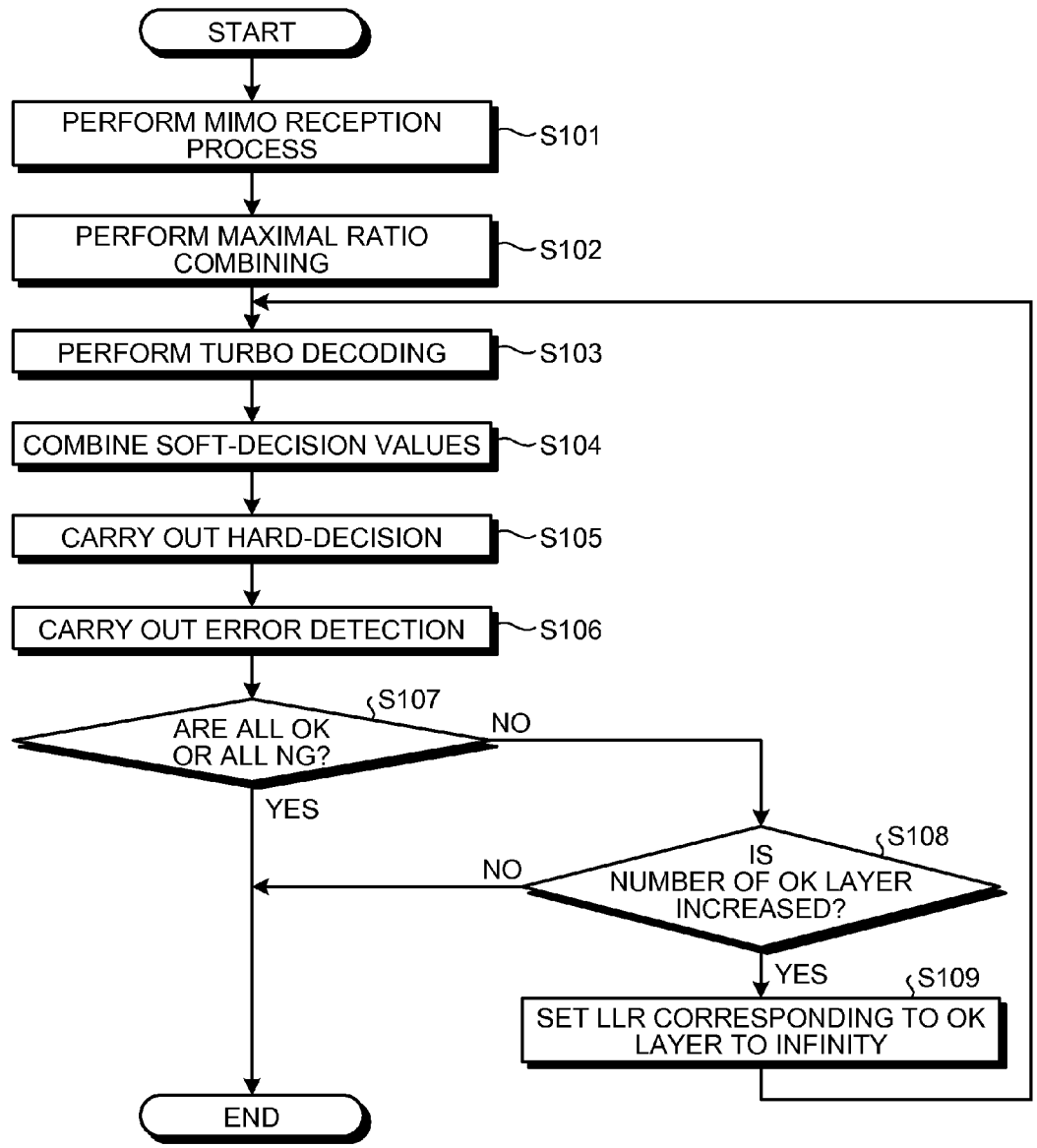
FIG. 5 is a flowchart illustrating a receiving operation performed by the receiver according to the one embodiment.

The operation performed by the receiver illustrated in FIG. 2 will be described with specific examples with reference to a flowchart illustrated in FIG. 5.

The MIMO processing unit 202 performs a reception process such as a given matrix operation (step S101), whereby the received data in the antennas 201-0 to 201-3 are separated into the packets of the layers 0 to 3 in the transmitter. These packets of the layers 0 to 3 are fed to the maximal ratio combining units 203-0 to 203-3. In this case, the respective maximal ratio combining units 203-0 to 203-3 are fed with packets of layers having duplicate portions of the layers 0 to 3, in addition to the packets of the corresponding layers 0 to 3.

Specifically, because the layer 0 and the layers 2 and 3 have duplicate portions, the maximal ratio combining unit 203-0 receives the packets of the layer 0, the layer 2, and the layer 3. Because the layer 1 and the layers 2 and 3 have duplicate portions, the maximal ratio combining unit 203-1 receives the packets of the layer 1, the layer 2, and the layer 3. Similarly, because the layer 2 and the layers 0 and 1 have duplicate portions, the maximal ratio combining unit 203-2 receives the packets of the layer 0, the layer 1, and the layer 2. Because the layer 3 and the layers 0 and 1 have duplicate portions, the maximal ratio combining unit 203-3 receives the packets of the layer 0, the layer 1, and the layer 3.

The maximal ratio combining units 203-0 to 203-3 then maximal-ratio-combine duplicate portions of each packet (step S102). More specifically, as illustrated in FIG. 6, in the maximal ratio combining unit 203-0, the information bits I0,0 of the layer 0 and the layer 2 are maximal-ratio-combined and the information bits I0,1 of the layer 0 and the layer 3 are maximal-ratio-combined. In the maximal ratio combining unit 203-1, the information bits I1,1 of the layer 1 and the layer 2 are maximal-ratio-combined and the information bits I1,0 of the layer 1 and the layer 3 are maximal-ratio-combined. Similarly, in the maximal ratio combining unit 203-2, the information bits I0,0 of the layer 2 and the layer 0 are maximal-ratio-combined and the information bits I1,1 of the layer 2 and the layer 1 are maximal-ratio-combined. In the maximal ratio combining unit 203-3, the information bits I0,1 of the layer 3 and the layer 0 are maximal-ratio-combined and the information bits I1,0 of the layer 3 and the layer 1 are maximal-ratio-combined.

In this manner, the maximal ratio combining units 203-0 to 203-3 maximal-ratio-combine the duplicate portions of packets of different layers, whereby packets propagated through different channels are combined, and thus a diversity gain is obtained. As a result, deterioration in reception quality can be compensated.

The respective packets of the layers 0 to 3 in which information bits are maximal-ratio-combined by the maximal ratio combining unit 203-0 to 203-3 are output to the turbo decoding units 204-0 to 204-3 where turbo decoding is performed by the turbo decoding units 204-0 to 204-3 (step S103). In other words, redundant bits included in the respective packets and preset LLRs are used to carry out decoding to obtain soft-decision values for information bits in a packet of each layer. Specifically, the turbo decoding unit 204-0 uses the redundant bits P0,0,0,1 to obtain soft-decision values for the information bits I0,0, I0,1, and the turbo decoding unit 204-1 uses the redundant bits P1,0,1,1 to obtain soft-decision values for the information bits I1,0, I1,1. Similarly, the turbo decoding unit 204-2 uses the redundant bits P0,0,1,1 to obtain soft-decision values for the information bits I0,0, I1,1, and the turbo decoding unit 204-3 uses the redundant bits P0,1,1,0 to obtain soft-decision values for the information bits I0,1, I1,0.

Figure 7:
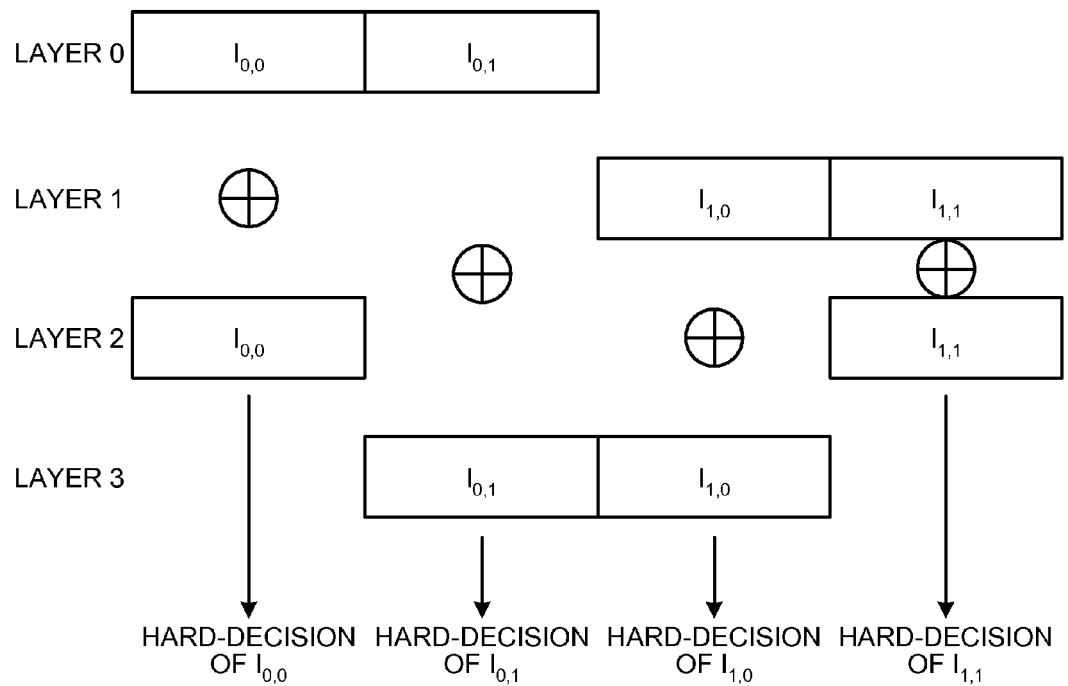
FIG. 7 is a diagram illustrating a specific example of soft-decision value combining.

The soft-decision values obtained by turbo decoding are combined by the soft-decision value combining unit 205 (step S104). In other words, because turbo decoding on information bits in duplicate has been carried out in the turbo decoding units 204-0 to 204-3, the soft-decision values for the information bits in duplicate are combined by the soft-decision value combining unit 205. Specifically, as illustrated in FIG. 7, the soft-decision values for the information bits I0,0 of the layer 0 and the layer 2 are combined, the soft-decision values for the information bits I0,1 of the layer 0 and the layer 3 are combined, the soft-decision values for the information bits I1,0 of the layer 1 and the layer 3 are combined, and the soft-decision values for the information bits I1,1 of the layer 1 and the layer 2 are combined. Accordingly, by combining soft-decision values of different layers for the same information bits, a gain by cross-layer mapping in the transmitter is obtained. As a consequence, the deterioration in reception quality can be compensated.

The respective combined results of soft-decision values for information bits of the layers 0 to 3 are output to the hard-decision unit 206 where hard-decision is carried out (step S105). More specifically, it is determined to which hard-decision value of "0" or "1" each of information bits of the layers 0 to 3 including the information bits I0,0, I0,1, I1,0, I1,1 corresponds. In the present embodiment, because hard-decision is carried out after soft-decision values are combined in the soft-decision value combining unit 205, the accuracy of hard-decision values obtained in the hard-decision unit 206 is high.

The hard-decision values for the layers 0 to 3 are then output to the error detection unit 207 where error detection on a hard-decision value for each layer is carried out using a portion corresponding to a CRC in the hard-decision value for each layer (step S106). The result of error detection for each layer is notified to the decode controller 208, and the decode controller 208 determines if there is no error in all hard-decision values for the layers 0 to 3, or if there are errors in all hard-decision values for the layers 0 to 3 (step S107).

As a result of the determination, when there is no error in all hard-decision values for the layers 0 to 3 (Yes at step S107), which means that iterative decoding by the turbo decoding units 204-0 to 204-3 is not necessary, the decode controller 208 instructs the turbo decoding units 204-0 to 204-3 to cancel iterative decoding. In this case, because hard-decision values obtained from original packets can be considered equal to the information bits in the transmitter, the error detection unit 207 outputs, for example, the hard-decision values for the layer 0 and the layer 1 as information bits.

Similarly, when there are errors in all hard-decision values for the layers 0 to 3 (Yes at step S107), which means that it is difficult to improve the error rate even if the turbo decoding units 204-0 to 204-3 carry out iterative decoding, the decode controller 208 instructs the turbo decoding units 204-0 to 204-3 to cancel iterative decoding. In this case, it may be configured such that retransmission of the packets is requested to the transmitter.

On the other hand, when there are at least one each of layers not having any errors in a hard-decision value and layers having errors in a hard-decision value (No at step S107), the decode controller 208 continues to determine whether the number of layers not having any errors in a hard-decision value is increased from the previous round of decoding (step S108). Because it is after the first round of decoding is performed here, it is determined that the number of layers not having any errors in a hard-decision value is increased (Yes at step S108), and the decode controller 208 instructs the turbo decoding units 204-0 to 204-3 to carry out iterative decoding.

The LLR setting unit 209 feeds back the hard-decision values not having any errors to the turbo decoding units 204-0 to 204-3, and the portions of information bits of each of the layers 0 to 3 corresponding to the hard-decision values not having any errors are substituted with the hard-decision values. More specifically, as a result of error detection in the error detection unit 207, for example, when it is determined that there is no error in a hard-decision value for the layer 0, because a hard-decision value for the layer 0 corresponds to the information bits I0,0, I0,1, the LLR setting unit 209 feeds back the hard-decision value corresponding to the information bits I0,0, I0,1. Furthermore, because the information bits I0,0, I0,1 are also included in the layer 2 and the layer 3, information bits I0,0, I0,1 portions of the layer 2 and the layer 3 are substituted with the hard-decision value fed back by the LLR setting unit 209 in the turbo decoding units 204-2, 204-3.

Accordingly, when hard-decision values for the original packets (packets of the layer 0 and the layer 1 here) are fed back by the LLR setting unit 209, portions of the auxiliary packets (packets of the layer 2 and the layer 3 here) are substituted with the hard-decision values fed back. In contrast, when hard-decision values for the auxiliary packets are fed back by the LLR setting unit 209, portions of the original packets are substituted with the hard-decision values fed back. At the same time, the LLR setting unit 209 sets LLRs for the portions substituted with the hard-decision values to infinity (step S109). In other words, after the first round of decoding, in the turbo decoding units 204-0 to 204-3, portions of each packet are substituted with hard-decision values not having any errors and LLRs for the corresponding portions are set to a maximum.

The turbo decoding units 204-0 to 204-3 perform turbo decoding on the packets again (step S103). In this case, at least the turbo decoding units 204-0 to 204-3 corresponding to layers in which a portion of a packet is substituted with a hard-decision value carry out turbo decoding. In the second round of decoding, portions of packets are substituted with hard-decision values not having any errors and LLRs for the corresponding portions are set to infinity. Accordingly, the turbo decoding units 204-0 to 204-3 carries out turbo decoding under the assumption that there is no error in the hard-decision value portions of the packets, and thus soft-decision values of higher accuracy than the first round of decoding are obtained.

Similarly to the first round of decoding, the soft-decision value combining unit 205 combines soft-decision values for the layers 0 to 3 (step S104), the hard-decision unit 206 performs hard-decision on the combined soft-decision values (step S105), and the error detection unit 207 carries out error detection using a CRC (step S106). As a result, when there is no longer an error in all hard-decision values for the layers 0 to 3 (Yes at step S107), the decode controller 208 instructs the turbo decoding units 204-0 to 204-3 to cancel iterative decoding.

Furthermore, even if the layers having errors in hard-decision values are left (No at step S107), when the number of layers not having any errors in a hard-decision value is not increased from the previous round of decoding (No at step S108), it is considered difficult to expect further improvement in error rate than the present. Therefore, the decode controller 208 instructs the turbo decoding units 204-0 to 204-3 to cancel iterative decoding. On the other hand, when the number of layers not having any errors in a hard-decision value is increased from the previous round of decoding (Yes at step S108), the above-described iterative decoding is carried out until there is no error in all hard-decision values for the layers 0 to 3 or the number of layers not having any errors in a hard-decision value is not increased.

Specific Examples of Iterative Decoding

A specific example of iterative decoding according to the present embodiment will be explained with reference to FIG. 8. In the followings, it is assumed that all the turbo decoding units 204-0 to 204-3 carry out turbo decoding in the second and subsequent rounds of decoding.

Figure 8:
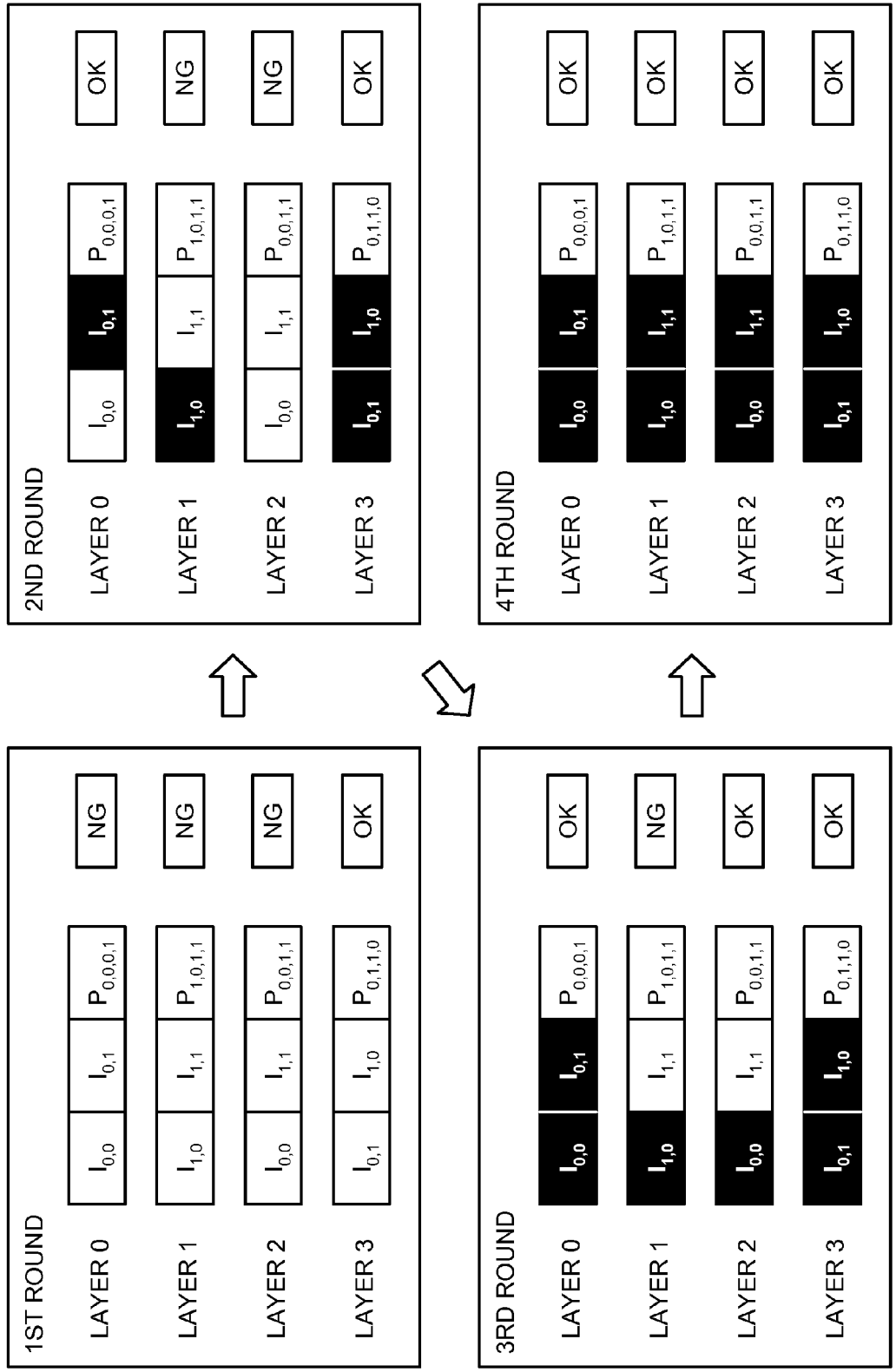
FIG. 8 is a diagram illustrating a specific example of iterative decoding.

As illustrated in the upper left portion of FIG. 8, it is assumed that, as a result of the first round of decoding, no error is detected from a hard-decision value for the layer 3 and errors are detected from hard-decision values for the layers 0 to 2. In this case, because there are at least one each of layers not having any errors in a hard-decision value and layers having errors in a hard-decision value, the decode controller 208 instructs the turbo decoding units 204-0 to 204-3 to carry out iterative decoding. Because there is no error in the hard-decision value for the layer 3, the LLR setting unit 209 substitutes the information bits I0,1 of the layer 0 and the information bits I1,0 of the layer 1 with the hard-decision value for the layer 3 and the LLRs for these information bits are set to infinity.

This means that, in the second round of decoding, as illustrated in the upper right portion of FIG. 8, with LLRs for portions of packets of the layer 0 and the layer 1 indicated in black in the drawing being set to infinity, the turbo decoding units 204-0 to 204-3 carry out turbo decoding. Accordingly, because decoding is carried out under the assumption that the information bits I0,1 in the layer 0 and the information bits I1,0 in the layer 1 are correct, the accuracy of soft-decision values for the layer 0 and the layer 1 becomes higher than the first round of decoding. As a result of this, it is assumed that errors are no longer detected from the hard-decision value for the layer 0 by the second round of decoding.

In this case, because there are at least one each of layers not having any errors in a hard-decision value (i.e., the layers 0, 3) and layers having errors in a hard-decision value (i.e., the layers 1, 2), and the number of layers not having any errors in a hard-decision value is increased from the first round of decoding, the decode controller 208 instructs the turbo decoding units 204-0 to 204-3 to carry out iterative decoding. Furthermore, because there is no longer an error in the hard-decision value for the layer 0, the LLR setting unit 209 substitutes the information bits I0,0 of the layer 2 with the hard-decision value for the layer 0 and the LLR for the information bits I0,0 is set to infinity.

This means that, in the third round of decoding, as illustrated in the lower left portion of FIG. 8, with the LLR for a portion of a packet of the layer 2 indicated in black in the drawing being set to infinity, the turbo decoding units 204-0 to 204-3 carry out turbo decoding. Accordingly, because the decoding is carried out under the assumption of the information bits I0,0 in the layer 2 being correct, the accuracy of soft-decision values for the layer 2 becomes higher than the first and the second rounds of decoding. As a result of this, it is assumed that errors are no longer detected from the hard-decision value for the layer 2 by the third round of decoding.

In this case, because there are at least one each of layers not having any errors in a hard-decision value (i.e., the layers 0, 2, 3) and layers having errors in a hard-decision value (i.e., the layer 1), and the number of layers not having any errors in a hard-decision value is increased from the second round of decoding, the decode controller 208 instructs the turbo decoding units 204-0 to 204-3 to carry out iterative decoding. Furthermore, because there is no longer an error in the hard-decision value for the layer 2, the LLR setting unit 209 substitutes the information bits I1,1 of the layer 1 with the hard-decision value for the layer 2 and the LLR for the information bits I1,1 is set to infinity.

This means that, in the fourth round of decoding, as illustrated in the lower right portion of FIG. 8, with LLRs for portions of packet of the layer 1 indicated in black in the drawing being set to infinity, the turbo decoding units 204-0 to 204-3 carry out turbo decoding. Accordingly, because decoding is carried out under the assumption that the information bits I1,0, I1,1 in the layer 1 are correct, the accuracy of a soft-decision value for the layer 1 becomes higher than the first to the third rounds of decoding. As a result of this, it is assumed that errors are no longer detected from a hard-decision value for the layer 1 by the fourth round of decoding.

In this case, because there is no error in hard-decision values for all the layers, the decode controller 208 instructs the turbo decoding units 204-0 to 204-3 to cancel iterative decoding. Furthermore, the hard-decision values for the layer 0 and the layer 1 are output from the error detection unit 207 as the information bits in the transmitter. By carrying out iterative decoding in such a manner, the error rate of received data can be reduced. In other words, even if reception quality deteriorates to some extent, an error rate of a certain standard can be satisfied, and thus an occurrence frequency of retransmission is lowered. As a consequence, the throughput in MIMO communication can surely be improved.

Figure 9:
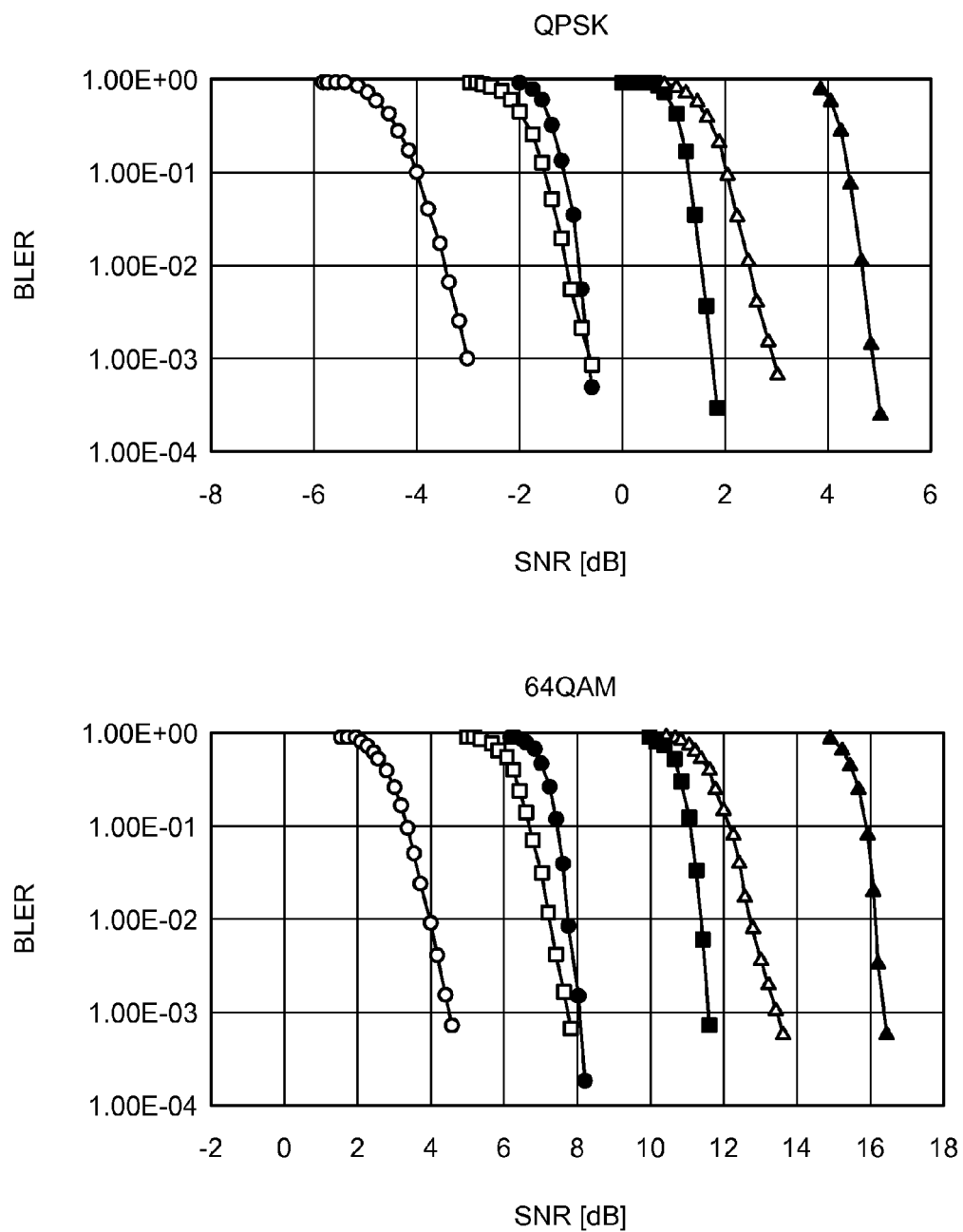
FIG. 9 is a pair of graphs illustrating specific examples of relationships between reception quality and error rate.

FIG. 9 is a pair of graphs illustrating specific examples of relationships between reception quality and error rate when carrying out iterative decoding according to the present embodiment and when carrying out conventional decoding. The upper graph in FIG. 9 represents a relationship of signal to noise ratio (SNR) and block error rate (BLER) when the modulation method in the transmitter is QPSK, while the lower graph in FIG. 9 represents a relationship of SNR and BLER when the modulation method in the transmitter is 64 QAM. Graph lines indicated with open symbols in the drawing correspond to iterative decoding according to the present embodiment and graph lines indicated with black filled symbols in the drawing correspond to conventional decoding. Graph lines indicated with circles correspond to a coding rate of one third in the transmitter, graph lines indicated with squares correspond to a coding rate of one half in the transmitter, and graph lines indicated with triangles correspond to a coding rate of three quarters in the transmitter.

As is apparent from these graphs, in any modulation method and at any coding rate, an SNR to satisfy a BLER of the same level is lower when the iterative decoding according to the present embodiment is carried out. This means that, by carrying out the iterative decoding according to the present embodiment, an error rate of a certain standard can be achieved even when reception quality deteriorates to some extent. Specifically, when QPSK is employed as the modulation method, even when the SNR deteriorates by about 2.2 to 3.0 dB from that of the conventional decoding, the deterioration of reception quality can be compensated by the iterative decoding according to the present embodiment. When 64 QAM is employed as the modulation method, even when the SNR deteriorates by about 3.5 to 4.3 dB from that of the conventional decoding, the deterioration of reception quality can be compensated by the iterative decoding according to the present embodiment. Furthermore, although not depicted in FIG. 9, when 16 QAM is employed as the modulation method, even when the SNR deteriorates by about 3.0 to 3.5 dB from that of the conventional decoding, the deterioration of reception quality can be compensated by the iterative decoding according to the present embodiment.

As described in the foregoing, according to the present embodiment, the transmitter, when mapping information bits to a plurality of layers, carries out cross-layer mapping in which a portion of the information bits mapped to one layer is mapped to the other layers in duplicate and transmits packets of the respective layers through a plurality of antennas. The receiver then, after separating the packets of the respective layers, carries out decoding for each of the layers while combining duplicate portions of the layers, and carries out iterative decoding by feeding back decoding results of the layers not having any errors detected. Accordingly, the layers can be compensated with one another by the duplicate portions of the layers, whereby an error rate of received data can be reduced and throughput can surely be improved.

In the above embodiment, while packets of the layers 0 to 3 are combined by the maximal ratio combining units 203-0 to 203-3 of the receiver, combining of these packets is not restricted to maximal ratio combining. In other words, as long as energy of packets of the layers 0 to 3 is combined and thus a diversity gain is obtained, the method of combining packets of the layers 0 to 3 may be optional.

In the above embodiment, while an example of 4×4 MIMO communication in which both the transmitter and the receiver include four antennas each has been explained, the number of antennas of the transmitter and that of the receiver are not restricted to four. In other words, in general, when a transmitter and a receiver include m pieces (m being an integer of 2 or more) of antennas each, a similar effect to the above embodiment can be obtained by defining packets of n pieces of layers out of m pieces of layers (n<m) as original packets and defining (m−n) pieces of layers as auxiliary packets.

Figure 10:
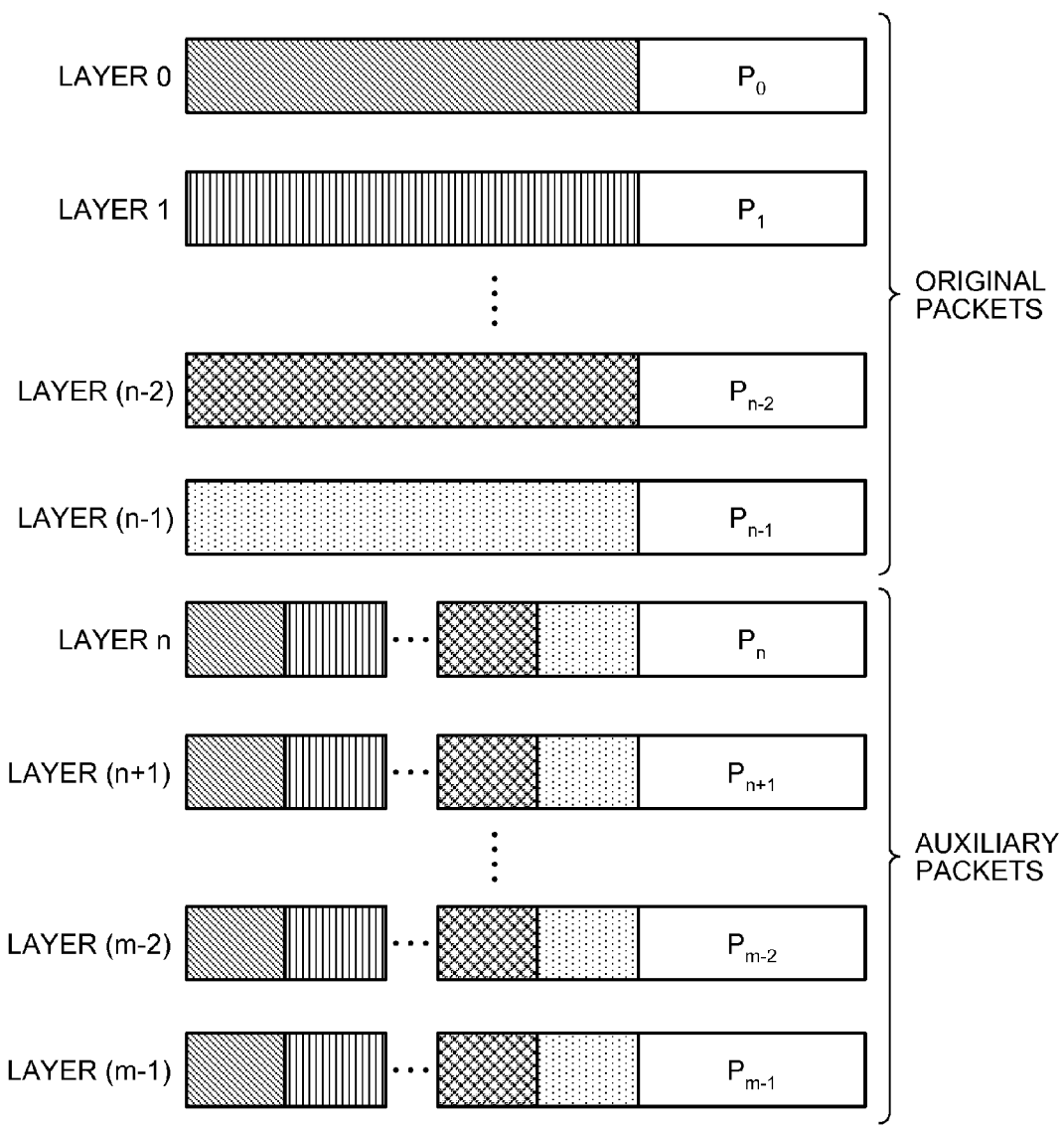
FIG. 10 is a diagram illustrating another specific example of cross-layer mapping.

Specifically, as illustrated in FIG. 10, when packets of n pieces of layers from layer 0 to layer (n−1) are defined as original packets, packets of (m−n) pieces of layers from layer n to layer (m−1) are defined as auxiliary packets. In n pieces of original packets of the layers 0 to (n−1), redundant bits PO to Pn−1 are added to information bits, respectively. Meanwhile, in (m−n) pieces of auxiliary packets of the layers n to (m−1), information bits are configured with the respective information bits of n pieces of original packets equally divided and combined, and redundant bits Pn to Pm−1 are then added to the overall information bits. In FIG. 10, various types of hatching distinctly represent information bits of original packets of the respective layers.

By such cross-layer mapping, for example, when an original packet of the layer 0 and an auxiliary packet of the layer n are compared, a part of information bits is in duplicate and a part of the information bits is different. Similarly, in a combination of any one of original packets and any one of auxiliary packets, a part of information bits is in duplicate and a part of the information bits is different. Therefore, in the receiver, after decoding packets of respective layers, soft-decision values for the duplicate portions of information bits can be combined, whereby decoding accuracy is improved. Furthermore, when either of an original packet or an auxiliary packet is correctly decoded and an error in a hard-decision value is no longer detected, iterative decoding can be carried out by substituting the corresponding part of the other of the original packet or the auxiliary packet with a hard-decision value not having any errors detected. As a result of this, for each decoding iterated, the decoding accuracy for a packet of each layer is synergistically improved, and thus an error rate can be reduced. Consequently, this allows occurrence of retransmitting packets to be suppressed and throughput to be improved.

Figure 11:
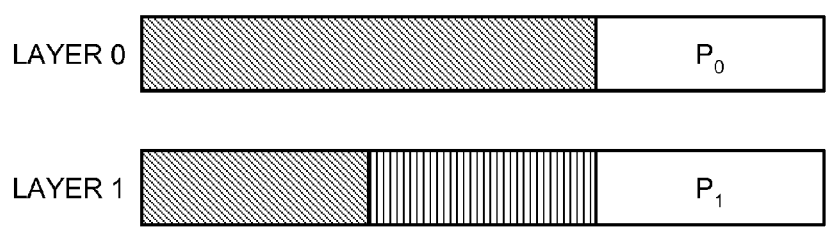
FIG. 11 is a diagram illustrating still another specific example of cross-layer mapping.

As described in the foregoing, while information bits of an original packet are duplicated to a part of information bits of an auxiliary packet, all of the information bits of the original packet are not necessarily duplicated to the part of the information bits of the auxiliary packet. More specifically, for example, as illustrated in FIG. 11, when information bits are mapped only to two layers of layer 0 and layer 1, it is enough simply that a half of the information bits mapped in the layer 0 is mapped to the layer 1 in duplicate. Even in this case, defining a packet of the layer 0 as an original packet and a packet of the layer 1 as an auxiliary packet makes a part of the information bits duplicated and a part of the information bits different between these packets.

Furthermore, in the above embodiment, while all the turbo coding units 103-0 to 103-3 have been described to carry out turbo coding at the same coding rate, the coding rate for each layer may be different. Specifically, as illustrated in FIG. 12, even when coding rates for packets of respective layers are different, in the combination of an original packet and an auxiliary packet, a part of information bits is in duplicate and a part of the information bits is different. In this case, the cross-layer mapping unit 101 of the transmitter carries out mapping in consideration of the coding rates for the respective layers. More specifically, the cross-layer mapping unit 101 distributes and maps the information bits of the original packets of the layers 0 to (n−1) based on the coding rates for the respective auxiliary packets of the layers n to (m−1). The turbo coding units then carry out coding at the coding rates corresponding to the size of the respective information bits included in the original packets or the auxiliary packets.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A multi-antenna communication apparatus comprising:
a mapping unit that maps first information data and second information data to packets of a first layer and a second layer, respectively, out of a plurality of layers corresponding to a plurality of antennas, maps a part of the first information data and a part of the second information data to a packet of a third layer, and maps another part of the first information data and another part of the second information data to a packet of a forth layer;
a coding unit that generates transmission data by performing error detection coding and error correction coding for each of the layers on the first and second information data mapped to the packets by the mapping unit; and
a transmitting unit that transmits the transmission data for each of the layers generated by the coding unit from the antennas corresponding to the respective layers.

2. The multi-antenna communication apparatus according to claim 1, wherein the coding unit adds a CRC code to each of the first and second information data respectively mapped to the packets of the first layer, the second layer, the third layer and the forth layer.

3. The multi-antenna communication apparatus according to claim 1, wherein the mapping unit generates a plurality of pieces of partial information data by dividing the first information data and the second information data mapped to the packets of the first layer and the second layer, respectively, and maps any pieces of the partial information data to the packets of the third layer and the forth layer.

4. The multi-antenna communication apparatus according to claim 3, wherein the mapping unit generates the partial information data by equally dividing the first information data and the second information data mapped to the packets of the first layer and the second layer.

5. The multi-antenna communication apparatus according to claim 3, wherein
the coding unit performs error correction coding on information data of packets to which partial information data is mapped at a coding rate corresponding to a size of respective pieces of partial information data.

6. The multi-antenna communication apparatus according to claim 4, wherein
the coding unit performs error correction coding on information data of all packets to which partial information data is mapped at a same coding rate.

7. A multi-antenna communication apparatus comprising:
a reception processing unit that receives data of a plurality of layers, and separates received data into a plurality of layer packets for each of the layers including a layer packet of a first layer to which first information data is mapped, a layer packet of a second layer to which second information data is mapped, a layer packet of a third layer to which a part of the first information data and a part of the second information data is mapped and a layer packet of a forth layer to which another part of the first information data and another part of the second information data is mapped;
a decoding unit that generates a soft-decision value for each of the layers by performing error correction decoding on the layer packets obtained by being separated by the reception processing unit;
a combining unit that combines soft-decision values corresponding to information data redundantly mapped to the plurality of layers out of soft-decision values for the respective layers generated by the decoding unit; and
a deciding unit that performs hard-decision on the layer packets using a soft-decision value obtained by being combined by the combining unit.

8. The multi-antenna communication apparatus according to claim 7, further comprising
a data combining unit that combines the layer packet of the first layer obtained by being separated by the reception processing unit with a portion of the layer packets of the third layer and the forth layer, wherein
the decoding unit performs error correction decoding on the layer packet of the first layer after being combined by the data combining unit.

9. The multi-antenna communication apparatus according to claim 7, further comprising:
a detecting unit that detects an error from a result of hard-decision on the layer packets by the deciding unit; and
a feedback unit that feeds back to the decoding unit the result of hard-decision on the layer packets in which no error is detected as a result of error detection by the detecting unit, wherein
the decoding unit performs error correction decoding by substituting a portion of the layer packets corresponding to the result of hard-decision fed back by the feedback unit with the result of hard-decision.

10. The multi-antenna communication apparatus according to claim 9, wherein the decoding unit sets a log-likelihood ratio for the portion substituted with the result of hard-decision to infinity and performs turbo decoding on the layer packets after the substitution.

11. The multi-antenna communication apparatus according to claim 9, further comprising a controller that cancels error correction decoding by the decoding unit when no error is detected from all layer packets as a result of error detection by the detecting unit.

12. The multi-antenna communication apparatus according to claim 11, wherein the controller cancels error correction decoding by the decoding unit when number of layer packets in which no error is detected is not increased from a previous round of error detection as a result of error detection by the detecting unit.

13. A method of multi-antenna communication, the method comprising:
mapping first information data and second information data to packets of a first layer and a second layer, respectively, out of a plurality of layers corresponding to a plurality of antennas, mapping a part of the first information data and a part of the second information data to a packet of a third layer, and mapping another part of the first information data and another part of the second information data to a packet of a forth layer;
generating transmission data by performing for each of the layers error detection coding and error correction coding on the first and second information data mapped to the packets at the mapping; and
transmitting the transmission data for each of the layers generated at the generating from the antennas corresponding to the respective layers.

14. A method of multi-antenna communication, the method comprising:
receiving data of a plurality of layers and separating received data into a plurality of layer packets for each of the layers including a layer packet of a first layer to which first information data is mapped, a layer packet of a second layer to which second information data is mapped, a layer packet of a third layer to which a part of the first information data and a part of the second information data is mapped and a layer packet of a forth layer to which another part of the first information data and another part of the second information data is mapped;
generating a soft-decision value for each of the layers by performing error correction decoding on the layer packets obtained by being separated at the separating;
combining soft-decision values corresponding to information data redundantly mapped to the plurality of layers out of the soft-decision values for the respective layers generated at the generating; and
performing hard-decision on the layer packets using a soft-decision value obtained by being combined at the combining.

* * * * *